April 25, 1944. H. Y. MAGEOCH 2,347,425
CLUTCH FOR FARE REGISTERS
Filed Feb. 20, 1941 4 Sheets-Sheet 3
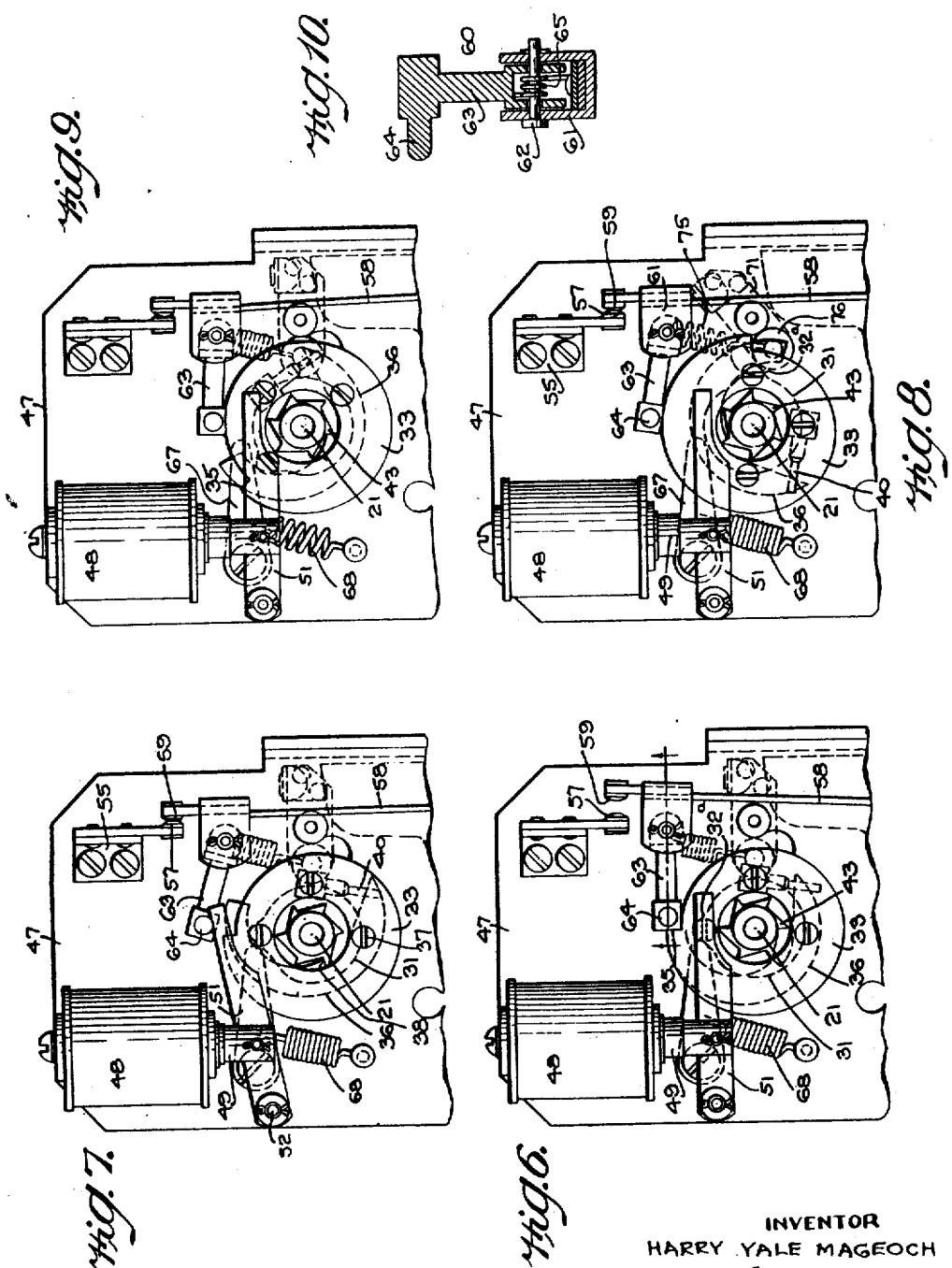
INVENTOR
HARRY YALE MAGEOCH
BY Leo Edelson
ATTORNEY

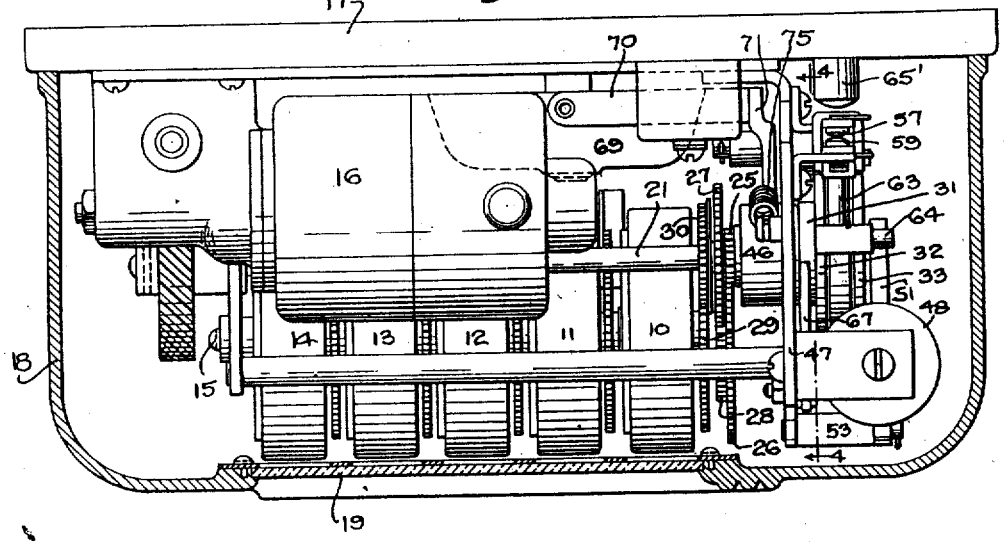

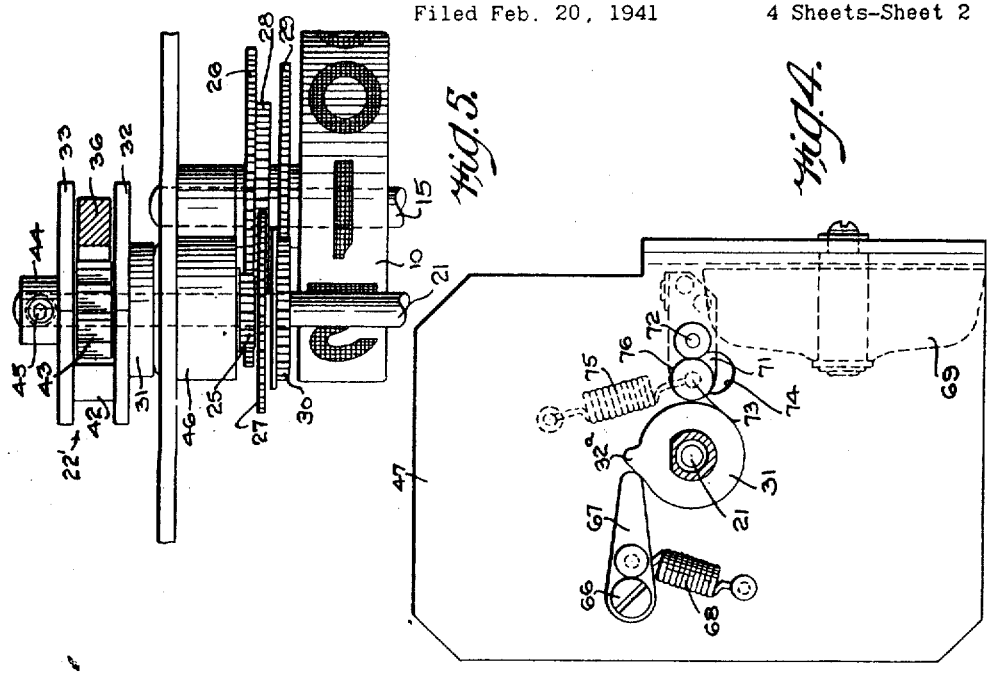
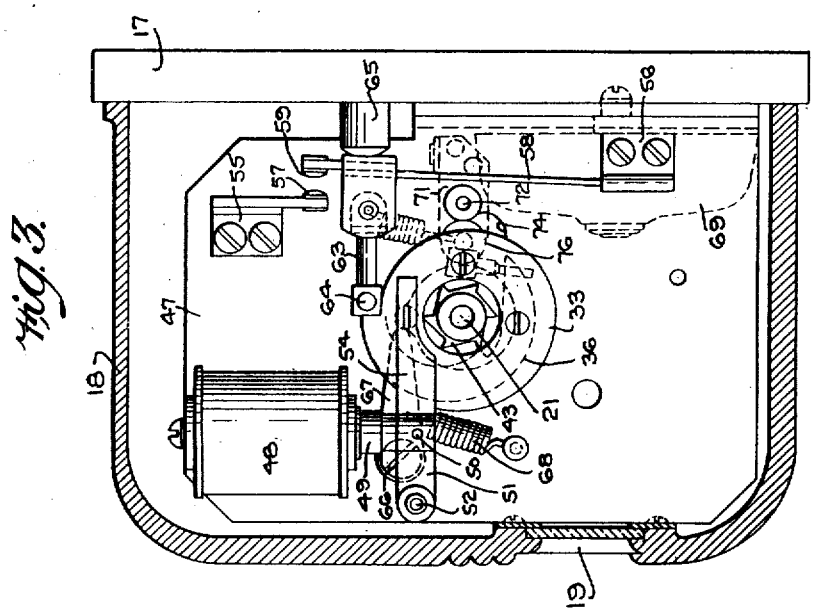

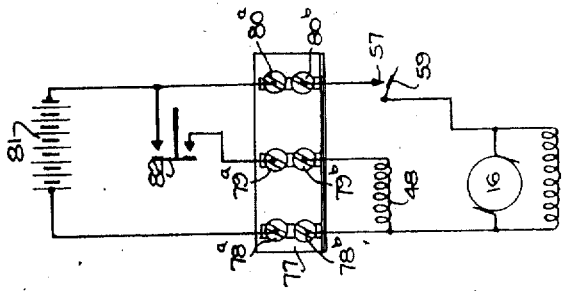
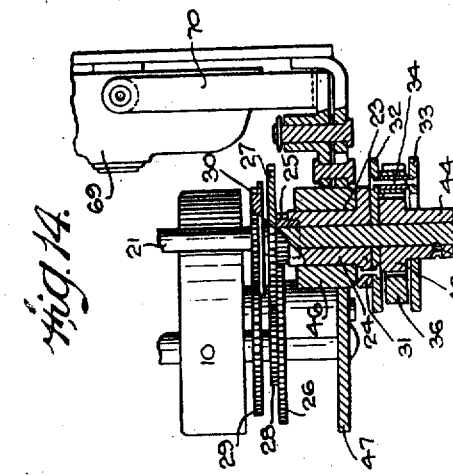
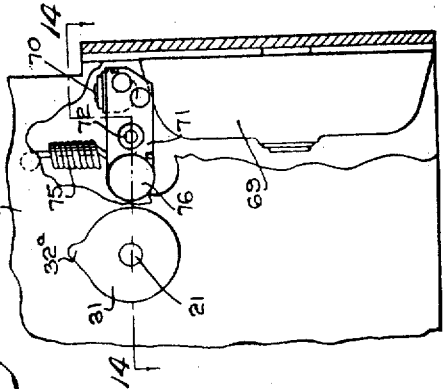
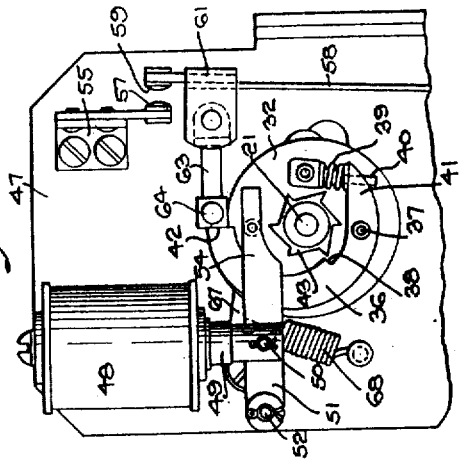

Patented Apr. 25, 1944

2,347,425

UNITED STATES PATENT OFFICE 2,347,425

CLUTCH FOR FARE REGISTERS

Harry Yale Mageoch, Philadelphia, Pa., assignor to Electric Service Supplies Company, Philadelphia, Pa., a corporation of Pennsylvania Application February 20, 1941, Serial No. 379,779

4 Claims. (Cl. 192—28)

This invention relates generally to registers and more particularly to an improved construction of clutch mechanism for controlling the operation of fare registers.

Among the principal objects of the present invention is to provide a clutch mechanism which is automatically operative to insure accurate indexing of the numerals in relation to the sight window through which the total number of fares registered is observed. In this connection, it is pointed out that the clutch mechanism of the present invention is adapted for use in connection with that type of fare register wherein a plurality of numeral wheels are coaxially arranged for rotation about a common shaft, each of these wheels being provided with a series of circumferentially spaced digits reading from "0 to 9," the wheels being operatively so related that successive actuation of the register presents successively to view the digits appearing on the last wheel of the series, then presents successively to view each digit on the next succeeding wheel for each complete revolution of the last wheel in the series, each wheel in the series being rotated to present a succeeding numeral to view when the wheel immediately preceding it makes a complete revolution. It is imperative that in the operation of this type of fare register that the numerals on the successive wheels line up with one another along a line paralleling the common shaft of the numeral wheels, this in order that all of the digits of the total number of fares registered be clearly visible in the sight window usually provided in the casing for the mechanism. Generally, this sight window is of a width just sufficient to expose to view the aligned digits when the latter are properly centered in the window.

Heretofore and prior to this invention considerable difficulty has been encountered in attempting to prevent overrunning or under-running of the numerals on the numeral wheels in relation to the sight window, it being apparent that in the absence of proper control of the rotation of these wheels one or more digits of the total number of fares registered would appear only partially in the sight window of the register casing, and even more important than this, such over-running or under-running, if continued for each actuation of the register, would result eventually in the appearance of an incorrect total figure in the sight window of the register, this being due to the fact that the increments of over-running or under-running are additive and combine to produce erroneous indications in the register.

The present invention has as one of its principal objects the provision of a clutch mechanism to insure complete appearance of each numeral in proper relative position in the side window upon each actuation of the register by the operator thereof, this result being obtained by the present mechanism even though the driving motor therefor continues to coast after the current supply to the motor is cut off.

The present invention also provides for the successive appearance of a plurality of sequential numerals at the will of the operator by a single prolonged operation of the switch controlling the operation of the fare register, thereby making it possible to register as many fares as may be desired upon a single actuation of the controlling switch. In every instance, however, over-running as well as under-running of the numeral wheels in relation to the fixed side window is effectually precluded even though the motor continues to coast after the power supplied thereto is interrupted.

A further and important object of the present invention is to provide in a register of the character hereinabove referred to an improved construction of clutch mechanism which insures against over-running as well as under-running of the numeral indexing mechanism, and at the same time provides for simultaneous mechanical and electrical disconnection of the main driving member, i. e., the electric motor and its driving shaft, from the driven members of the mechanism by which the several numeral wheels are successively indexed in the proper position.

A still further object is to provide an improved construction of a clutch mechanism for a fare register wherein all of the foregoing objectives are attained without placing any undue stress or load upon any part of the fare registering mechanism, the arrangement being such that immediately upon disengagement of the clutch, which is effected automatically as a fare is registered, the main driving member of the fare registering mechanism, to wit, the motor, is freed of all load so that, even though the motor continues to operate, further actuation of the fare registering means is precluded. The arrangement is such, however, that, if desired, the current supplied to the motor may be interrupted simultaneously as the clutch is disengaged, in which event the motor may continue to coast without actuating the fare registering mechanism.

Still another object is to provide a clutch mechanism of such design and operation as to provide for positive interlock between the driving and driven members of the mechanism and so consequently provide for the use of full available torque at the point of connection between said driving and driven members for ultimate transmission of the driving member of the clutch.

A still further object is to provide a clutch mechanism of such design and operation as to insure that the numeral wheels come to rest only at predetermined established points without necessarily interrupting the operation of the prime mover, that is, the electric motor.

Further, it is an object of the present invention to provide an arrangement whereby any number of fare registers may be operated independently of each other through the use of a corresponding number of clutch units and all of which may be driven by a single motor, the several clutches being coaxially arranged upon a common shaft which is driven by the motor, each clutch being adapted to be individually actuated to control the operation of the fare register immediately associated therewith.

Still further objects and advantages of the invention, such as those relating to economies in manufacture and operation resulting from the particular design and construction of the present mechanism will appear more fully hereinafter, it being understood that the present invention consists substantially in the combination, construction, location and relative arrangement of parts, all as will be described more fully hereinafter, as is shown in the accompanying drawings and will be pointed out in the appended claims.

In the accompanying drawings, which are illustrative of a mechanism constructed in accordance with and embodying the principles of the present invention:

Figure 1 is a front view of the mechanism with the enclosing casing therefor removed;

Figure 2 is a top plan view of the mechanism wherein the enclosing casing is shown in horizontal section;

Figure 3 is a right-hand elevational view of the device as shown in Figure 2;

Figure 4 is a view taken substantially on the line 4—4 of Figure 2;

Figure 5 is a somewhat enlarged plan view of the clutch unit of the mechanism and several of the parts of the register immediately associated therewith;

Figure 6 is an end elevational view of the clutch unit and associated parts as the same appears when the register is at complete rest position with the clutch ratchet free to rotate;

Figure 7 is a view corresponding to Figure 6 but showing the relation of the parts upon energization of the solenoid;

Figure 8 is a similar view showing the clutch in advanced position from that shown in Figure 7;

Figure 9 is a view showing the relation of the clutch and its associated parts as the clutch approaches its initial at rest position as shown in Figure 6;

Figure 10 is a sectional view showing the details of construction of the pivoted clutch dog;

Fig. 11 is a view corresponding to Figure 6 with the outer clutch plate removed;

Figure 12 is a view corresponding to Figure 7 with the outer clutch plate removed;

Figure 13 is a view showing the mounting of the fare registering bell in relation to the actuating device therefor;

Figure 14 is a transverse sectional view of the clutch unit and associated parts taken on the line 14—14 of Figure 13; and Figure 15 is a diagrammatic view of a preferred electrical circuit for operating the mechanism of the present invention.

Referring now to the drawings and more particularly to Figures 1 and 2, it will be observed that the fare register as constructed in accordance with and embodying the principles of the present invention is of the general type which includes a plurality of number wheels or drums 10, 11, 12, 13 and 14, each of which is provided with a set of ten circumferentially spaced digits reading from "0 to 9," these digits being, of course, spaced uniformly about the circumferential surface of each wheel. These wheels 10 to 14 are mounted coaxially upon a common shaft 15 and are so geared to each other that as each of them completes a revolution it rotates the next succeeding wheel one-tenth of a revolution. Thus, as the wheel 10 makes a complete revolution, the wheel 11 is revolved to the extent of one-tenth of a revolution and, as the wheel 11 makes a complete revolution, it in turn causes the wheel 12 to rotate through one-tenth of a revolution and so on for all of the numeral wheels. The construction of the register in so far as the assembly and operation of the numeral wheels and their actuating parts are concerned is in accordance with conventional practice and need not further be described herein, it being simply noted in this connection that it is the object of the present invention to insure that the indexing of the numeral wheel 10 is such that each digit thereof appears successively at a given point upon each actuation of the register, the arrangement being such as to preclude any possibility for the numeral wheel 10 and the remaining numeral wheels which are entrained therewith from over-running or under-running as rotation is imparted thereto by the electric motor 16.

As appears most clearly in Figures 1, 2 and 3, the register mechanism of the present invention is mounted upon a base 17 to which is secured in any suitable manner a casing or housing 18 for the mechanism. This casing or housing 18 is provided in one face thereof with a rectangular opening or sight window 19 which is preferably fitted with glass to render the housing dust-proof. This sight window 19 extends transversely across all of the numeral wheels 10 to 14 and is of a width just sufficient to render visible a series of longitudinally aligned numerals such as those that compose the number "95000" in Figure 1.

Preferably, the register of the present invention is mounted with its base 17 secured to a vertical surface and, accordingly, it will be understood that Figure 2 is a view looking down upon the top of the mechanism, while Figure 1 is a view looking toward the front of it.

The counter mechanism which in the example shown is of the five digit non-reset rotary type, is driven by the motor 16 through a positive clutch which is adapted to be controlled at the will of the operator by means of an electric switch which is in electrical circuit with and energizes a solenoid to effect engagement of the clutch and to start the motor. In general, the operation of the mechanism is such that after the solenoid has been deenergized, the clutch will automatically open at a predeterminedly established point so as to locate one of the digits appearing on the numeral wheel 10 directly in centered registry with the sight window 19. The operation of the mechanism is such that the numeral wheel 10 cannot over-run or under-run upon interruption in operation of the motor, even though the latter should continue to coast, nor can such numeral wheel 10 over-run or under-run even though the motor continues to operate under power supplied thereto.

The clutch mechanism for controlling the operation of the register will now be described, it being observed in this connection that the motor 16 is connected to and drives, by means of suitable spiral gearing 20, a main shaft 21 which is journalled, as at 22 and 23 (see Figures 1 and 14), for rotation about an axis spaced laterally from and paralleling the common axis of rotation of the numeral wheels 10 to 14. Secured to the outer end of the main drive shaft 21, that is, to the right-hand end thereof as viewed in Figures 1 and 2, is the clutch assembly as constructed in accordance with and embodying the principles of the present invention, this assembly being designated by the reference numeral 22' and being shown in more or less detail in Figures 5 to 14, inclusive. The construction of the clutch unit 22' will be described more fully hereinafter, it being simply observed at this point that this clutch unit includes a sleeve 24 (see Figure 14) which is rotatably fitted upon the shaft 21 and which is provided at its inner end with a spur gear 25, the latter being rotatable with the sleeve 24 relatively to the shaft 21. This spur gear 25 engages the gear 26 which is freely rotatable about the shaft 15 of the numeral wheels and which in turn is engaged with a spur gear 27 freely rotatable on the main drive shaft 21. As appears most clearly in Figure 14, the gear 26 is entrained with the gear 27 through an intermediate gear 28 which is fixed to and rotates with the gear 26. The gear 26 is in turn entrained with the gear 29 which latter is secured to and rotates with the numeral wheel 10, the gear 27 being connected to the gear 29 through the intervention of an intermediate gear 30 which is fixed to and rotates with the gear 27. This gearing arrangement between the clutch unit and the counter mechanism is most clearly shown in Figure 14 and it will be apparent from an inspection of this figure that rotation of the sleeve 24 will impart a corresponding rotation, through a train of gears, commencing with gear 25 and ending with gear 29, to the first numeral wheel or drum 10. The ratio of this gearing is such that for each complete revolution of the sleeve 24 and, accordingly, of the spur gear 25, the numeral wheel 10 is rotated through one-tenth of a revolution, that is, to an extent sufficient to successively present squarely in the sight window 19 each of the digits on the unit numeral wheel 10.

It will be understood, of course, that the necessary rotation of the sleeve 24 of the clutch unit is imparted thereto by the main drive shaft 21, which latter is automatically engaged with and disengaged from the sleeve 24 through the intervention of the clutch mechanism now to be described. As most clearly appears in Figure 14, the sleeve 24 of the clutch unit is provided at its outer end with a radially extending cam element 31 which is provided at one point in its peripheral surface with a radially extending projection 32ª. Secured to the outer face of the cam element 31 are a pair of axially spaced cam plates 32 and 33, these plates being similar to each other and of the general configuration shown most clearly in Figures 6 to 8, inclusive. These plates are secured together in the axially spaced relation shown in Figure 14 by means of suitable spacers 34, it being noted that each of these cams is provided with a circumferential edge which is of gradually increasing radial distance from the center of the cam, the point on the cam edge which is of minimum radial distance from the cam center being joined to the point of maximum radial distance to form an abrupt edge 35 extending radially of the cam, the abrupt edges 35 of both cam plates 32 and 33 being in lateral alignment with each other.

Disposed between the cam plates 32 is a dog 36 of substantially crescent shape, this dog being pivoted, as at 37 (see Figures 11, 12 and 14), to the inner cam plate 32. Preferably, the pivot employed for the dog is one of the spacer elements by means of which the cam plates 32 and 33 are secured together. As most clearly appears in Figures 11 and 12, the inner edge of the dog 36 is provided with a single tooth 38 the function of which will become immediately apparent. The coil compression spring 39 arranged in embracing relation about a pin 40 suitably carried upon the inner face of the cam plate 32 presses against the free extremity 41 of the pivoted dog and imparts a positive spring-pressed bias thereto which tends to swing the toothed portion of the dog inwardly toward the central axis of the clutch unit. The opposite free end of the dog is sharply cut off, as at 42, to provide a surface which may be brought into alignment with the aligned edges 35 of the axially spaced cam plates 32 and 33. Normally, however, due to the bias imposed upon the dog by means of the compression spring 39, the upper free edge 42 of the dog assumes a position somewhat in advance of the cam plate edges 35—35 as shown most clearly in Figures 7, 8, 9 and 12.

Operatively associated with the dog 36 of the clutch unit is a ratchet 43, this ratched being provided with a plurality of teeth which are adapted to successively engage the tooth 38 of the spring-pressed pivoted dog 36. As appears quite clearly in Figure 14, the ratchet 43 is provided upon its outer side with an elongated integral sleeve 44 which closely embraces the main drive shaft 21 and which is non-rotatably secured to the latter by means of a set screw 45. It will thus be apparent from the foregoing description that when the dog 36 is in toothed engagement with the ratchet 43, any rotation of the main driving shaft 21 in clockwise direction will in turn be imparted to the unit numeral wheel 10 through the intervention of the entrained counter driving gears. It will also be apparent that when the dog 36 is in toothed engagement with the ratchet 43, all of the parts which comprise the clutch assembly, including the sleeve 24, the spur gear 25, the cam plates 32 and 33 and the engaged dog 36 and ratchet 43 rotate as a unit. However, upon disengagement of the dog 36 from toothed engagement with the ratchet 43, rotation of the main driving shaft 21 is imparted only to the ratchet 43 and consequently in such case no rotation is imparted to the numeral wheel 10.

As appears most clearly in Figure 14, the sleeve 24 of the clutch assembly is journalled within a bearing 46 secured to the end supporting plate 47 of the counter mechanism, this supporting plate 47 including as well the journaled bearing for one end of the counter wheel shaft 15. The plate 47 serves additionally as the support for a solenoid 48, the latter being disposed with its axis in vertically extending relation. The plunger 49 of the solenoid is suitably secured by means of a pivot pin 50 to a lever 51, this lever being pivoted, as at 52, for movement in a vertical plane. The lever 51 is spaced outwardly from the face of the supporting plate 47 by means of a suitable spacer 53 (see Figures 1 and 2), the arrangement being such that the free end portion 54 of the lever overlies the portion of the ratchet sleeve 44 which projects outwardly of the cam plate 33.

Also mounted upon the plate 48 are a pair of vertically spaced brackets 55 and 56 (see more particularly Figure 3), the bracket 55 serving as the fixed support for an insulated electrical contact member 57. The bracket 56 serves as a fixed support for an upwardly projecting relatively stiff spring member 58 to the upper end of which is fitted an insulated electrical terminal 59. Secured to and carried by the spring 58 immediately below the contact member 59 is a stop lever assembly 60 of the construction most clearly shown in Figure 10. This stop lever assembly includes a clevis member 61 between the arms of which extends a pivot pin 62 and upon which pin is pivoted a stop bar or lever 63 which is provided at its free end with a laterally extending pin 64. The stop lever or bar 63 is normally biased by means of the coil spring 65 to maintain the outer end thereof in constant contact with the peripheral edges of the cam plates 32 and 33, the laterally projecting pin 64 of the stop bar extending across the path of movement of the solenoid-actuated lever 51. A bumper 65' secured to the base 17 of the apparatus limits the movement of the stop bar assembly in one direction, while the spring 58 tends constantly to urge the stop bar in a direction away from the bumper and to an extent sufficient to cause the electrical contact 59 to engage the fixed contact 57. The general arrangement of the stop bar assembly is such that the free end of the spring-pressed stop bar 63 is normally engaged by the free end of the dog 36 and by the radial edges 35 of the cam plates 32 and 33. In consequence, the stop bar 63, when in the position shown in Figures 3, 6 and 11, interrupts the rotation of the parts of the clutch unit just referred to and is forced by the latter against the action of the spring 58 against the stop 65 to thereby separate the contact members 57 and 59.

Also pivoted to the end plate 47, as at 66, (see more particularly Figure 4) is a cam pawl 67, this pawl being disposed flatwise against the outer face of the supporting plate 47 and being spring-pressed, by means of the tension spring 68, into constant engagement with the peripheral edge of the inner cam 31. The function of the spring-pressed pawl 67 in relation to the cam 31 and other parts of the clutch unit will appear more fully hereinafter.

It is preferred that upon each actuation of the register that a bell be sounded and to that end a bell 69 is mounted upon the base 17 of the apparatus. Operatively associated with this bell is a clapper 70 the arm of which is suitably fixed and carried by one end of a lever 71 which is pivoted, as at 72, to the inner side of the end plate 47. The opposite end of this lever 71 is provided with a pin 73 which projects laterally through a suitable opening 74 provided in the end plate 47. This opening 74 is of such size and shape as to permit the bell clapper actuating lever 71 to have a limited movement about its central pivot 72, a tension spring 75 being provided to normally retain the lever 71 in the position shown most clearly in Figure 4. In this position, the bell clapper is just out of contact with the bell. Also, as well clearly be observed in Figure 4, the outer end of the pin 73 is fitted with a roller 76 disposed immediately adjacent the edge of the cam 31 and in the plane of the latter, it being apparent that, as the cam 31 rotates, the projection 32ª thereof engages the roller 76 of the clapper actuating lever 71 and swings it about its pivot 72 against the action of the spring 75. Immediately as the projection 32 passes the roller 76, the lever 71 snaps back into its initial position under the influence of the spring 75 and causes the clapper to strike the bell.

Before proceeding with a description of the operation of the mechanism, a description of the wiring circuit is believed to be in order, it being noted in this connection that the solenoid 48 is operative, when energized, to effect closing of the contacts 55 and 57. Referring now to the wiring diagram of Figure 15, it will be observed that it includes a diagrammatic showing of the terminal block 77 of Figure 1, this terminal block including the insulated pairs of terminal screws 78ª—78ª, 79ª—79ᵇ and 80ª and 80ᵇ, the terminal screws of each pair being electrically connected together. The terminal screws 78ª and 80ª are respectively connected to the terminals of a suitable source of supply, such as the battery 81, while the terminal screws 78ᵇ and 80ᵇ are respectively connected to the terminals of the motor 16, the conductor leading from the terminal screw 80ᵇ to one terminal of the motor 16 including therein the solenoid-controlled switch contacts 57 and 59. The solenoid 48 is itself connected across the terminal screws 78ᵇ and 79ᵇ, while a spring return type of gang switch 82 is connected across the terminals 79ª and 80ª, this latter switch being normally open as shown in Figure 15. The switch contact members 57 and 59 are also normally open, as shown when the mechanism is at rest. Upon closing the switch 82, the solenoid circuit is completed and the solenoid is thereupon energized. Energization of the solenoid 48 results in tripping of the stop lever controlling the action of the clutch dog and so permits the contacts 57 and 59 to be closed under the influence of the spring 58. These contacts 57 and 59 remain closed until the same are separated by the action of the clutch unit and, while closed, supply current from the battery 81 to the operating motor 16. It will be understood, of course, that the actuating switch 82 is closed only for the interval of time sufficient to energize the solenoid 48, a single momentary closure of the switch 82 being all that is required to cause the next digit on the numeral wheel 10 to appear in the sight window. However, should the switch 82 be maintained in closed position indefinitely, the counter will continue to register a new number for each successive single revolution of the main driving shaft 21.

For an understanding of the operation of the register as constructed in accordance with and embodying the principles of the present invention, reference is made more particularly to Figures 6 to 9 which show the relative position of the several parts of the clutch unit during various stages in the operation of the register. Figure 6 shows the position assumed by the clutch when the register is at complete rest, it being noted that in this position of the clutch the cam plates 32 and 33 thereof as well as the dog 36 are in engagement with the stop bar 63 and has urged the latter rearwardly against the response of the spring 58 so as to separate and maintain open the contact members 57 and 59. It will further be observed that in this position of the clutch, the dog 36 is pressed outwardly away from the central axis of the clutch so that the ratchet 43 is free to rotate without interference by the clutch dog 36. The solenoid 48 is in deenergized condition while the power of the motor is interrupted due to the contacts 57 and 59 being open. Also, the pawl 67 is in engagement with the projection 32ᵃ on the cam 31 so as to retard backward or counterclockwise rotation of the clutch unit during the period that the clutch is at rest. Of course, so long as the solenoid remains deenergized, the trip lever 51 remains in its inactive position shown in Figure 6, its own weight combined with that of the solenoid plunger 49 being sufficient to cause the trip lever to assume such inactive position.

Upon energization of the solenoid, which occurs when the register-actuating switch 82 (see Figure 15) is momentarily closed, the trip lever 51 is caused to move upwardly about its pivot 52 with the result that the outer end thereof engages the laterally extending pin 64 of the stop bar and shifts the latter out of engagement with the cam plates 32 and 33 of the switch and the dog 36 embraced between said cam plates. Immediately that the stop bar is so disengaged from the clutch, the dog 36, under the influence of the compression spring 39 (see Figures 11 and 12) swings inwardly about its pivot 37 to permit its tooth 38 to be engaged by one of the teeth of the ratchet 43. Simultaneously, the contacts 57 and 59 close under the influence of the spring 58, thereby completing the circuit to the driving motor 16 which then operates to drive the shaft 21 and through it the clutch unit as a whole. It will be observed at this point that at the instant the stop bar 63 is lifted out of engagement with the cam plates 32—33 of the clutch by the action of the trip lever 51, the clutch dog 36 swings into the position shown in Figure 7 to underlie the pin 64 of the stop bar and so prevents engagement of the stop bar with the edges 35 of the cam plates 32—33. Inasmuch as the dog 36 is locked to the ratchet 43, continued rotation of the motor shaft imparts corresponding rotation to the dog and to the cam plates 32—33, the latter being secured to the dog by the dog pivot pin 37.

As the clutch unit continues to rotate in clockwise direction by the motive power imparted thereto by the motor 16, a point is reached, as shown in Figure 8, at which the projection 32ᵃ of the cam 31 engages the roller 76 of the spring-pressed bell-ringing lever 71, it being observed that as the said projection 32ᵃ of the cam 31 swings the lever 71 into the position shown in Figure 8 and then continues beyond the roller 76, the lever 71 is released and under the influence of the tension spring 75 snaps back into its original position to thereby cause the bell clapper to strike the bell. As clearly appears in Figure 8, the trip lever 51 is returned to its initial inactive position due to the deenergization of the solenoid 48.

The clutch unit continues to rotate in clockwise direction to make a complete revolution, Figure 9 showing the unit at the instant just prior to completing one of said revolutions. In this position of the clutch unit, the radial edges of the cam plates 32 and 33 as well as the radial face of the dog 36 are in position to engage the stop bar 63 which is normally pressed into its position shown by the coil spring 65 (see Fig. 10.)

As the radial face of the dog 36 engages the stop bar 63, continued rotation of the clutch unit causes the said dog to shift the stop bar 63 against its fixed abutment 66 (see Fig. 3) to thereby open the contacts 57 and 59. As the stop bar 63 is limited in its further movement by engagement with the said abutment 66, continued rotation of the clutch unit causes the dog 36 to swing outwardly about its pivot 37 against the restraining influence of the spring 39 and so effects the separation of the contacts 57 and 59 as shown in Figure 6. However, in order to effect the opening of the contacts 57 and 59 and the disengagement of the clutch, it is not necessary for the stop bar 63 to engage the abutment 66 and the latter may in fact be dispensed with, it being simply necessary in such case to provide the spring 58 with sufficient force to counterbalance the restraining effort imposed on the clutch dog 36 by its compression spring 39. When the contacts 57 and 59 have been opened to their full extent, continued rotation of the cam plates 32—33 and of the dog 36 will be interrupted, although the ratchet 43 may continue to rotate so long as power in the form of stored energy due to inertia is applied to its shaft 21.

This completes the cycle of operation, during which a complete revolution of the clutch unit has resulted in the rotation of the numeral wheel 10 to an extent sufficient to present in the sight window of the casing the next digit on the wheel, such digits appearing successively in said sight window for each successive complete rotation of the clutch unit. At this point, it will be observed that the spring-pressed pawl 67, upon return of the clutch unit to its initial starting position, as shown in Figure 6, is in engagement with the rear side of the projection 32ᵃ on the bell-ringing cam 31 to thereby retard backward or counterclockwise motion of the clutch members, which would otherwise occur due to the action of the spring 39 on the dog 36 and of the spring 58 on the stop bar 63.

From the foregoing description of the operation of the present mechanism, it will be apparent that for each momentary electrical impulse imparted to the solenoid 48 to energize the same, the clutch unit will be actuated to index the numeral wheel 10 to the extent of a single numeral appearing on the face thereof, each numeral being presented squarely in the center of the sight window 19 upon each momentary actuation of the switch 82. Even though the motor continues to rotate under power or by coasting without power, the counter-actuating gears are rendered inoperative automatically as the clutch unit completes a single revolution. Thus, over-running or under-running of the register numerals with respect to the sight window is effectually precluded. Should it be desired to register a number of fares in rapid sequence, all that is necessary is for the operator to maintain the switch 82 closed and so provide for continued energization of the solenoid 48. So long as the solenoid 48 remains so energized, the stop bar 63 is held in the position shown in Figure 7 and the clutch unit is then operative to permit the motor 16 to drive the counter-acting gears continuously for as many revolutions of the clutch unit as there are fares to be registered on the mechanism.

It will be understood, of course, that various modifications may be made in the electrical connections for governing the operation of the mechanism and it will be further apparent that a plurality of registers like that herein described may be operated from a single shaft driven by a single motor, each register having operatively associated therewith an individual clutch unit, the several solenoids for controlling the operation of the several clutch units being suitably wired in circuit with a source of supply for selective energization thereof as may be desired. In such an arrangement, any one or more of the registers may be actuated as desired through the use of only a single motor.

While in the mechanism as hereinbefore described, and as shown in the drawings, a solenoid 48 is employed for electrically actuating a trip lever 51 to trip the stop bar 63, it will be apparent that in lieu of this solenoid any suitable mechanical means may be employed for mechanically operating the trip lever 51 at the will of the operator or, if desired, the trip lever 51 may be entirely dispensed with and suitable means employed for actuating directly the stop bar 63. In this latter connection, it is within the contemplation of the present invention to even eliminate the electrical contact elements 57 and 59 for controlling the operation of the motor and in place thereof employing a manually operated switch for controlling the operation of the motor 16. In such case, it would be necessary only to pivotally mount the stop bar 63 upon a fixed support therefor, the arrangement being such that as the stop bar 63 assumes its position shown in Figure 6, the drive shaft 21 is disconnected from the driven mechanism even though the motor continues to operate under power supplied thereto.

Also, it will be understood that while the mechanism of the present invention has been shown and described in relation to a fare register, it is applicable for use with various mechanisms wherein it may be desirable to insure accurate indexing or step by step rotation of a driven member. Accordingly, the present invention is not intended to be limited for use in connection with a fare register as herein shown and described but may in fact be embodied in any apparatus the operation of which may be facilitated by the use of a clutch unit constructed in accordance with and embodying the principles of the present invention.

It will be understood that various changes and modifications may be made from time to time without departing from the real spirit or general principles of the invention and it is, accordingly, intended to claim the same broadly, as well as specifically, as indicated in the appended claims.

What is claimed as new and useful is:

1. In a clutch mechanism of the character described, in combination, a main driving shaft, a driven shaft operatively associated therewith, a toothed member secured to the driving shaft for rotation therewith, a cam plate disposed for free rotation about said shaft, said cam plate being provided with a peripheral edge the radial distance of which from the center of the plate gradually increases throughout the full extent thereof to thereby provide at a given point in the peripheral edge of the plate an abrupt radially extending shoulder, a spring-pressed dog pivotally mounted upon one side of said plate, said dog being arranged for pivotal movement in the plane of rotation of said member and being adapted for toothed engagement with the latter, and a stop engageable by said dog upon rotation of said cam plate to shift said dog out of engagement with said member whereby to render said driving shaft freely rotatable with respect to said cam plate, said stop being spring-pressed to constantly engage the peripheral edge of said cam plate and being adapted automatically to engage said dog as said radial shoulder of the cam approaches said stop.

2. In a clutch mechanism of the character described, in combination, a main driving shaft, a driven shaft operatively associated therewith, a ratchet secured to the driving shaft for rotation therewith, a cam plate disposed for free rotation about said shaft, said cam plate being provided with a peripheral edge the radial distance of which from the center of the plate gradually increases throughout the full extent thereof to thereby provide at a given point in the peripheral edge of the plate an abrupt radially extending shoulder, a spring-pressed dog pivotally mounted upon one side of said plate, said dog being arranged for pivotal movement in the plane of rotation of said ratchet and being adapted for toothed engagement with the latter, a stop engageable by said dog upon rotation of said cam plate to shift said dog out of engagement with said ratchet whereby to render said driving shaft freely rotatable with respect to said cam plate, said stop being spring-pressed to constantly engage the peripheral edge of said cam plate and being adapted automatically to engage said dog as said radial shoulder of the cam approaches said stop, and means for tripping said stop at will whereby to render the same ineffective to hold the dog out of engagement with said ratchet.

3. In a clutch mechanism of the character described, in combination, a main driving shaft, a driven shaft operatively associated therewith, a toothed member secured to said driving shaft for rotation therewith, a cam plate freely rotatable about said drive shaft and so operatively associated with said driven shaft that upon rotation of said cam plate corresponding rotation is imparted to said driven shaft, the peripheral edge of said cam plate being of spiral form to provide a camming surface of gradually increasing radius with respect to the axis of rotation of the plate, the low spot or point of least radius of the cam being separated from the high spot or point of maximum radius by an abrupt shoulder extending radially of the cam plate, a spring-pressed clutch dog pivotally mounted upon said cam plate for rotation therewith about the axis of the driving shaft, said clutch dog being disposed for pivotal movement into and out of engagement with said member, one extremity of said clutch dog extending freely beyond the low spot on the cam plate, and a stop in engagement with said cam plate and adapted to engage said free end of the clutch dog to interrupt the rotation of the latter and its supporting cam plate simultaneously as said clutch dog is urged about its pivot outwardly from the center of rotation of the main shaft to thereby disconnect it from said toothed member.

4. In a clutch mechanism of the character described, in combination, a main driving shaft, a driven shaft operatively associated therewith, and a clutch unit operative to effect a driving connection between said driving and driven shafts, said clutch unit including a toothed member secured to the driving shaft for rotation therewith, a plate freely rotatable about said drive shaft and geared to said driven shaft, said plate being in the form of a cam having a peripheral edge the radial distance of which from the center of the plate gradually increases throughout the circumferential extent thereof to thereby provide at a given point in the peripheral edge of the plate an abrupt radially extending shoulder, a spring-pressed element secured to said plate for pivotal movement in the plane of rotation of said ratchet, said element being toothed for engagement with said member, the spring-pressed bias on said element being such as to normally maintain said element in toothed engagement with said member whereby rotation of the latter imparts corresponding rotation to said plate and the driven shaft geared to the latter, and a detent which is spring-biased to constantly engage the peripheral cam edge of said plate, said pivoted element on said plate having a free end adapted to engage said detent to arrest the rotation thereof simultaneously as it is shifted out of engagement with said member to thereby disconnect the driving shaft from said driven shaft.

HARRY YALE MAGEOCH.